United States Patent
Kimmich et al.

Patent Number: 6,144,161
Date of Patent: Nov. 7, 2000

[54] MICROCOMPUTER CONTROLLED PHOTOCELL UNIT

[75] Inventors: David Kimmich, Pasadena; Arthur Y. Arellanes, Tustin Ranch, both of Calif.

[73] Assignee: Inform 2000, Pasadena, Calif.

[21] Appl. No.: 09/333,847

[22] Filed: Jun. 15, 1999

Related U.S. Application Data

[60] Provisional application No. 60/089,431, Jun. 16, 1998.

[51] Int. Cl.[7] .................................................. H05B 37/02
[52] U.S. Cl. ...................... 315/159; 340/825.06; 362/802
[58] Field of Search ..................................... 315/159, 360; 362/802; 340/517, 526, 825.06

[56] References Cited

U.S. PATENT DOCUMENTS

| | | | |
|---|---|---|---|
| 4,598,286 | 7/1986 | Miller et al. | 340/825.06 |
| 5,637,964 | 6/1997 | Hakkaraimen et al. | 315/158 |
| 5,719,555 | 2/1998 | Zeytoonjian et al. | 340/571 |

*Primary Examiner*—Don Wong
*Assistant Examiner*—Thuy Vinh Tran
*Attorney, Agent, or Firm*—John E Wagner; Robert C. Smith

[57] ABSTRACT

A photocell unit in combination with a programmed microprocessor which samples the output of the photocell and detects day or night by sampling over a predetermined period of time, e.g. 80 minutes to establish a right reference value and a predetermined number of samples of increasing light values to establish a "sunrise detect value" to turn lights off. A further predetermined increase in light values is used to establish a "sunset detect" light value. This value is retained throughout the day until sensed light values again diminish to the "sunset. The sampling techniques makes the system immune from errors due to transient lights and also avoid unwanted daylight operation of lights or undetected light outages.

6 Claims, 8 Drawing Sheets

Fail safe detect routine

Fig. 6

MICROCOMPUTER CONTROLLED PHOTOCELL UNIT

REFERENCE TO RELATED APPLICATION

This non-provisional application is based upon the Provisional application, Ser. No. 60/089,431 filed Jun. 16, 1998.

BRIEF SUMMARY OF THE INVENTION

There are many applications to provide lighting at a desired level throughout the night. This is particularly true where commercial or retail facilities are unmanned overnight such as around business complexes and automatic teller machines (ATMs) at banks or in shopping centers. The problem of assuring reasonable safety for bank patrons who wish to use ATMs during the nighttime has resulted in legislation specifying a desired illumination level at and within a specified distance from ATMs. This level of illumination must be assured throughout the night. Should the illumination at a particular ATM fail or drop below the specified level, the repairs must be completed quickly. Thus means must be provided to monitor the illumination levels at and near the ATM to detect any failure or malfunction and to provide some kind of signal or input to a manned or unmanned control station so that corrective action can be effected.

Currently, the lighting industry is using photocell technology to respond to lamp failures and to activate and deactivate lighting at dusk and dawn. Although other technologies have been applied (photodiodes and phototransistors), photocells deliver the most predictable properties for lighting on/off purposes. Even with this advantage, however, there is the disadvantage that photocells have a wide tolerance from cell to cell which may be as high as ±33%. Therefore, photocell manufacturers have to make sure that the most sensitive photocells do not turn lights on too early or turn them off too late. The consequence of this is that the least sensitive photocells turn lights off too late in the morning and on too early in the evening. This wastes valuable electricity and lowers the mean time before failure of light bulbs and fixtures.

To avoid such dependence on a single cycle or actuation of the photocell, applicant's new microcomputer controlled photocell controls lights based on the increase of light from darkness. This avoids lights being turned on and off when controlled by a foot-candle value.

The microcomputer, when initially powered up, defaults to some gross value that will operate lights within acceptable on/off foot-candle readings. (5 to 30 foot candles). The system then samples whether it is day or night and then goes through the subsequent procedure, described below.

A predetermined period, e.g. eighty minutes after dark, the microcomputer will start if sampling what "night" looks like. It accomplishes this by counting samples over 80 minutes (126 samples—one every 45 seconds, for example, at a light level below normal daylight levels to determine that it is now night time. These samples of the converted analog to digital values can be averaged over the 80 minutes or at the end of this counting period, the microcomputer software can use the present night time value as a night reference value. This gives a "night" reference value used to detect when the sun is coming up. Periodically, e.g. every 45 seconds the microcomputer checks the environment to see if there has been an increase of light.

After a prescribed number of increases, the unit "senses" the sun coming up and switches an output to turn off the lights. The microcomputer then samples a number of additional increases and stores that value as a "sundown detect" value to turn the lights on that evening. Once dawn has been detected and the output switched to turn the lights off, the output will not change until the microcomputer has seen 80 minutes of daylight.

Daylight is defined by sensing many samples above "sunset detect" or the evening turn off light value. After 80 minutes of "daylight" detection, the microcomputer continues to look for the sundown detect value it stored in the morning to restore the switched output to turn the lights on again. The microcomputer then repeats this cycle indefinitely, adapting to changes in the internal and external environment. In addition, the microcomputer stores the values it calculated for the last few days and uses the average of these values for comparison purposes. When the proper number of increases have been detected, the microcomputer compares the value of the "sunrise detect" value and the "sundown detect" to the average of the last few days to make sure that this value is valid. This comparison is presently set to check if the value is 50% above the average total. If this function is used as a safety precaution in case any unpredictable environmental changes occur to delay the detection of sunrise. (For example: if an unidentified light source increased ambient light on the unit around sunrise so that increases of actual sunlight became difficult to detect.)

Since the microcomputer-controlled photocell looks for the only constant in a twenty-four hour period (darkness) it then has a reference with which to detect daylight. The photocell unit then looks for a pattern of increase of light over time, which only occurs at sun up. This eliminates the need for adjusting or repositioning photocells around a building. If the clear lens that the photocell looks through gets dirty, if the photocell values are inconsistent, even if the placement of the unit is varied, if the photocell encounters changes in the environment, if more ambient light is present at night, the unit will still sample what night looks like and sense the sun coming up in the morning, add a specific number of counts of increasing light values to establish a "sunset detect" value, and then log that relative value to turn lights on at night.

BRIEF DESCRIPTION OF THE DRAWING(S)

This invention may be more clearly understood with the following detailed description and by reference to the drawings in which.

DETAILED DESCRIPTION

Figure 1:
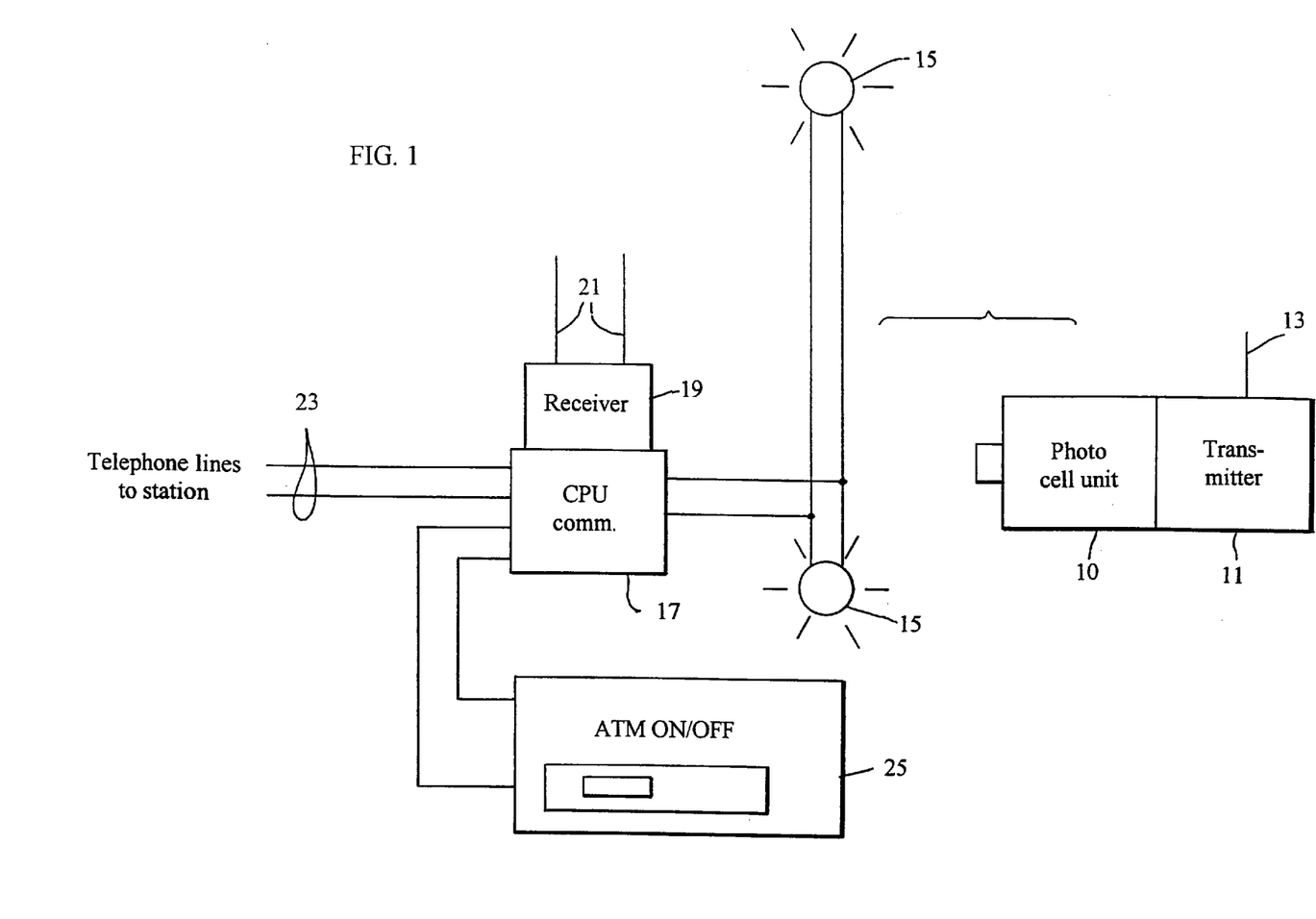
FIG. 1 is a simplified block diagram of a lamp control system using the microcomputer controlled photocell unit of the invention.

Referring now to FIG. 1, a microcomputer-controlled photocell unit 10 which, in most cases is mounted on the side of a building, is housed with a wireless transmitter 11 including an antenna 13. Photocell unit 10 is located where it is exposed to the ambient light level and illumination from lamps 15. Lamps 15 are turned on and off by a CPU and Command Unit 17 which receives as one of its inputs, signals from a receiver 19 which includes an antenna 21 receiving signals from transmitter 11 and antenna 13. CPU and Command Unit 17 may receive inputs from a number of other sources, so the transmitted signal from transmitter 13 may be coded to identify both the source and also the action to be taken such as to turn on the lamps 15, turn off the lamps 15, or that there is a failure of illumination from lamps 15 and that some corrective action is to be taken. Unit 10 may also be connected to the CPU and Command Unit through other data transmitting means such as a hard-wired connection, through a line carrier, or multiplexing arrangement.

In addition to sending out the lamp controlling signals, photocell unit 10 also sends out "check in" signals at regular intervals which are received by the CPU and command unit 17 which is programmed to expect them at the scheduled intervals. If such "check in" signals are not received when expected, it indicates a malfunction of a photocell unit 10 or transmitter 11 and will cause unit 17 to send a message via telephone lines 23 to a manned station (not shown) that such malfunction has occurred. Alternatively, unit 17 could send a signal to close the ATM 25.

Figure 1A:
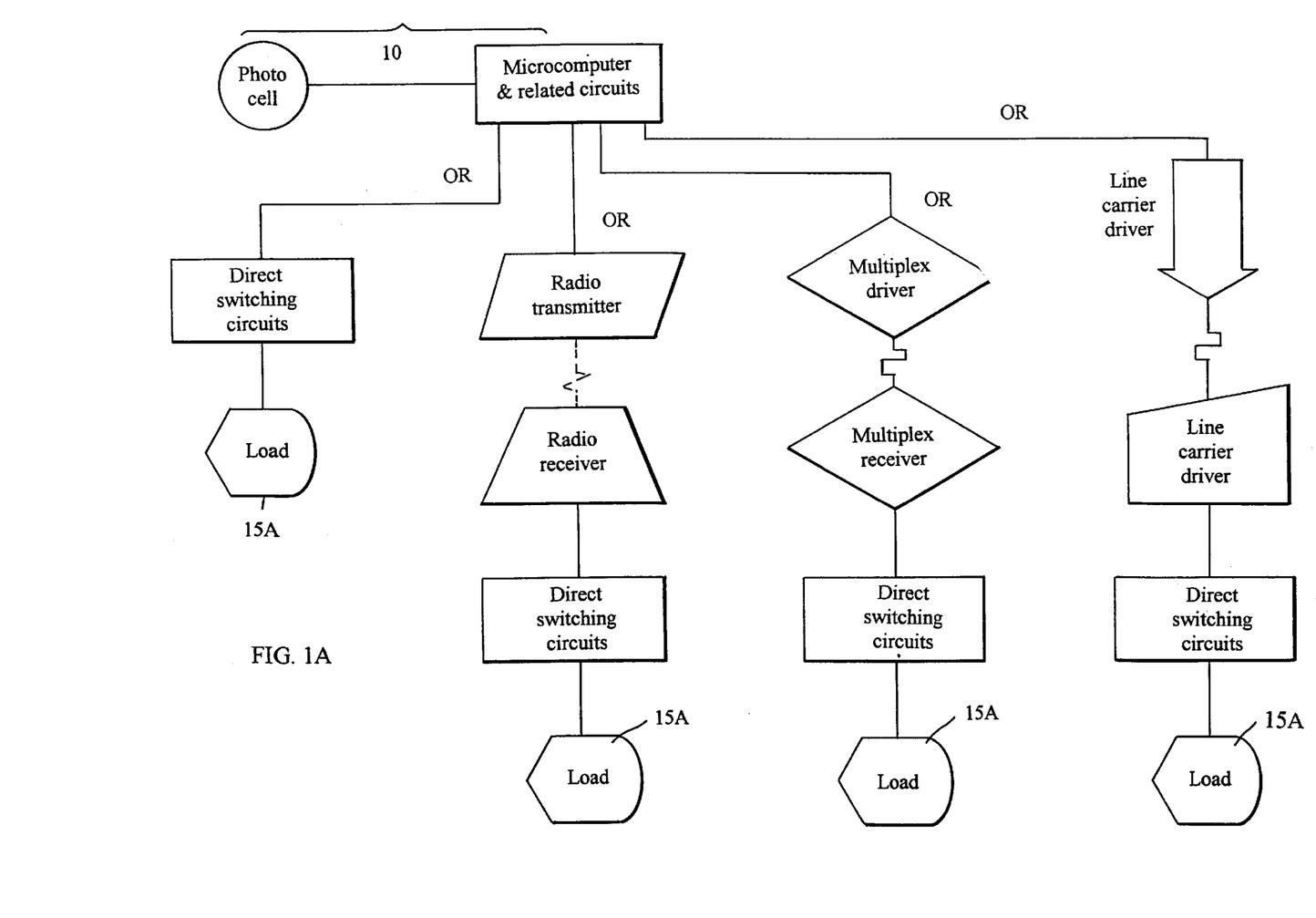
FIG. 1A is a block diagram showing the microcomputer controlled photocell connected to control a load through various signal transmission means.

FIG. 1A is a block diagram showing a plurality of different arrangements whereby the microcomputer output may be transmitted to control a load device. The microcomputer controlled photocell unit 10 is shown having connections through various alternative arrangements to a load 15A which could be lamps 15 or other load devices. Thus unit 10 may be connected to the load 15A through a direct wired connection and switching circuits, through a radio transmitter as in FIG. 1, through a multiplexing arrangement, or through a line carrier driver.

Figure 2:
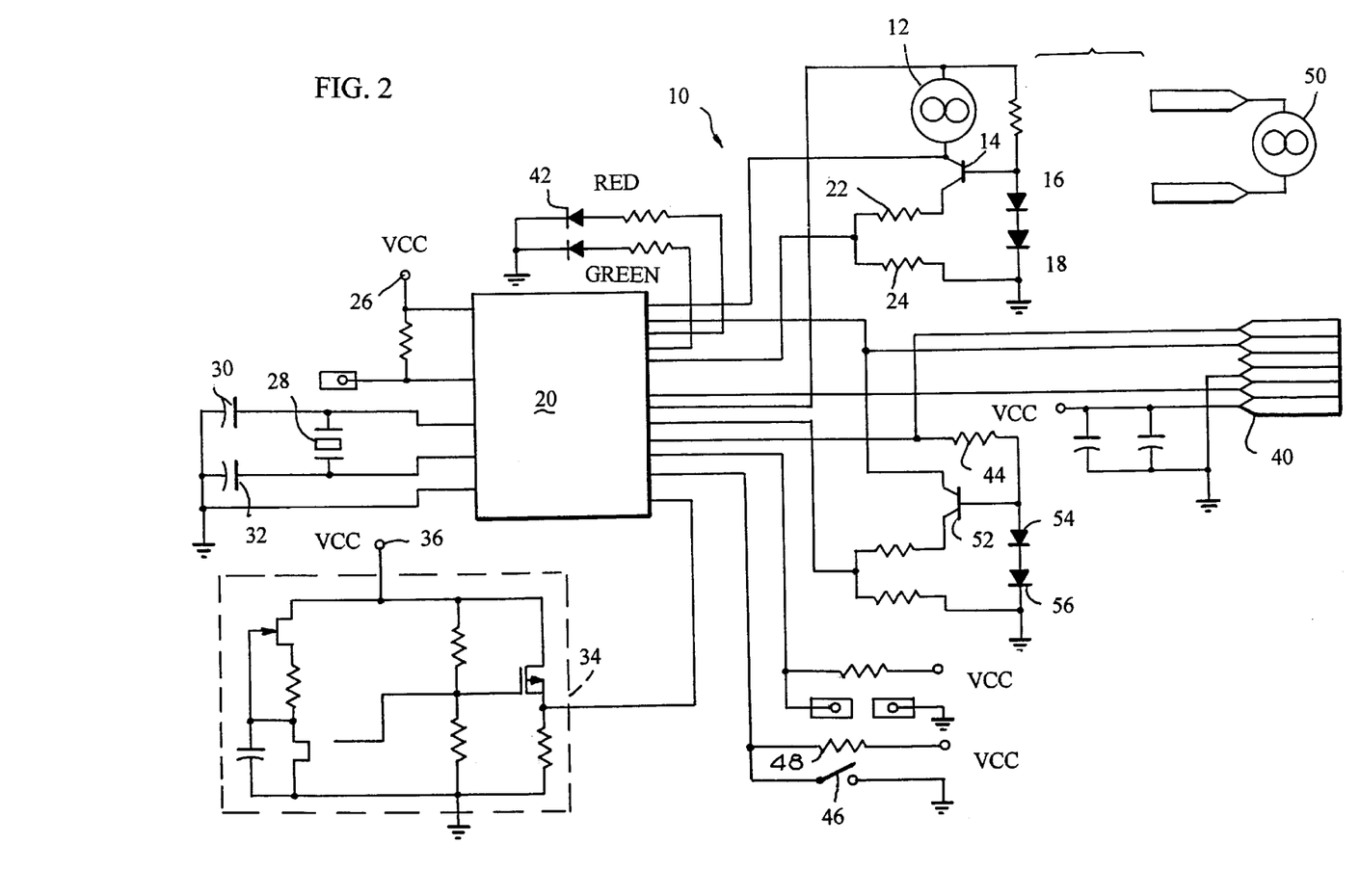
FIG. 2 is a schematic circuit diagram of the microcomputer controlled photocell unit 10 of FIG. 1.

Referring now to FIG. 2, the microcomputer controlled photocell unit 10 includes a photocell 12 which is connected into the collector circuit of a transistor 14. The base circuit of transistor 14 provides a constant current source and includes a pair of diodes 16, 18 which also provide temperature compensation. The collector circuit is connected to a terminal of a microcomputer 20 through a voltage divider circuit including resistors 22 and 24. The particular microcomputer used in this system is from Microchip Technology, Inc. of 2355 West Chandler Boulevard, Chandler, Ariz. 85224-6199 and designated PIC16C71.

The power supply for the unit 10 is from an externally located battery providing 3.6 volts. Connections to this battery are identified by VCC. Unit 10 is, or may be, connected to or located in the same housing with a wireless transmitter containing the battery. A battery terminal VCC is shown at numeral 26 connected to the microcomputer 20. Connected across the microcomputer clock terminals is a crystal 28 whose terminals are also connected to ground through capacitors 30 and 32.

If power supply is limited as with a battery source, an oscillator circuit 34 is also connected to the microcomputer 20 and it is connected to the battery power source at terminal 36. It is the primary function of the oscillator circuit 34 to trigger or "wake up" the microcomputer every 45 seconds to cause it to sample and record a light reading from the photocell. In this manner the microcomputer 20 remains quiescent (in a sleep mode), except for its clock, over a major part of the 45-second cycle thus reducing its power consumption to a very low value (1 microamp) consistent with a 10+ year life of the battery. In run mode, the microcomputer 20 responds to a pulse from the oscillator 34 to receive an input from the photocell 12 and take a reading as to the light value sensed. It then makes whatever comparison or evaluation is called for by its program. It may simply add a count, or call for a delay in accepting photocell inputs, or if it reaches a specified count of progressively increasing light values, it sends an output signal to the "ALARM" terminal of a 6-pin header 40 which becomes an input to the transmitter 11 which transmits a signal to receiver 19. While in run mode the microcomputer will consume approximately 50 microamps which occurs for 5 milliseconds every 45 seconds which averages 1–2 microamps continuously. Where there is no need to severely limit power consumption such as where unit 10 is hard wired to a light controller, no such oscillator 34 would be required.

If when the unit 10 is first installed it is daytime but the red LED 42 is illuminated indicating "night", the installer simply moves a magnet over a reed switch 46 which connects the battery voltage to ground through a resistor 48. This causes a signal to microcomputer 20 to change the illumination from the LED 42 to green and puts the program in step with the daytime ambient condition. Alternatively, the reed switch 46 may be closed and moving a magnet over it will open the reed switch sending a different signal to the microcomputer 20 to cause it to be put in a nighttime mode and changing the illumination of the LED 42 from green to red.

Figure 3:
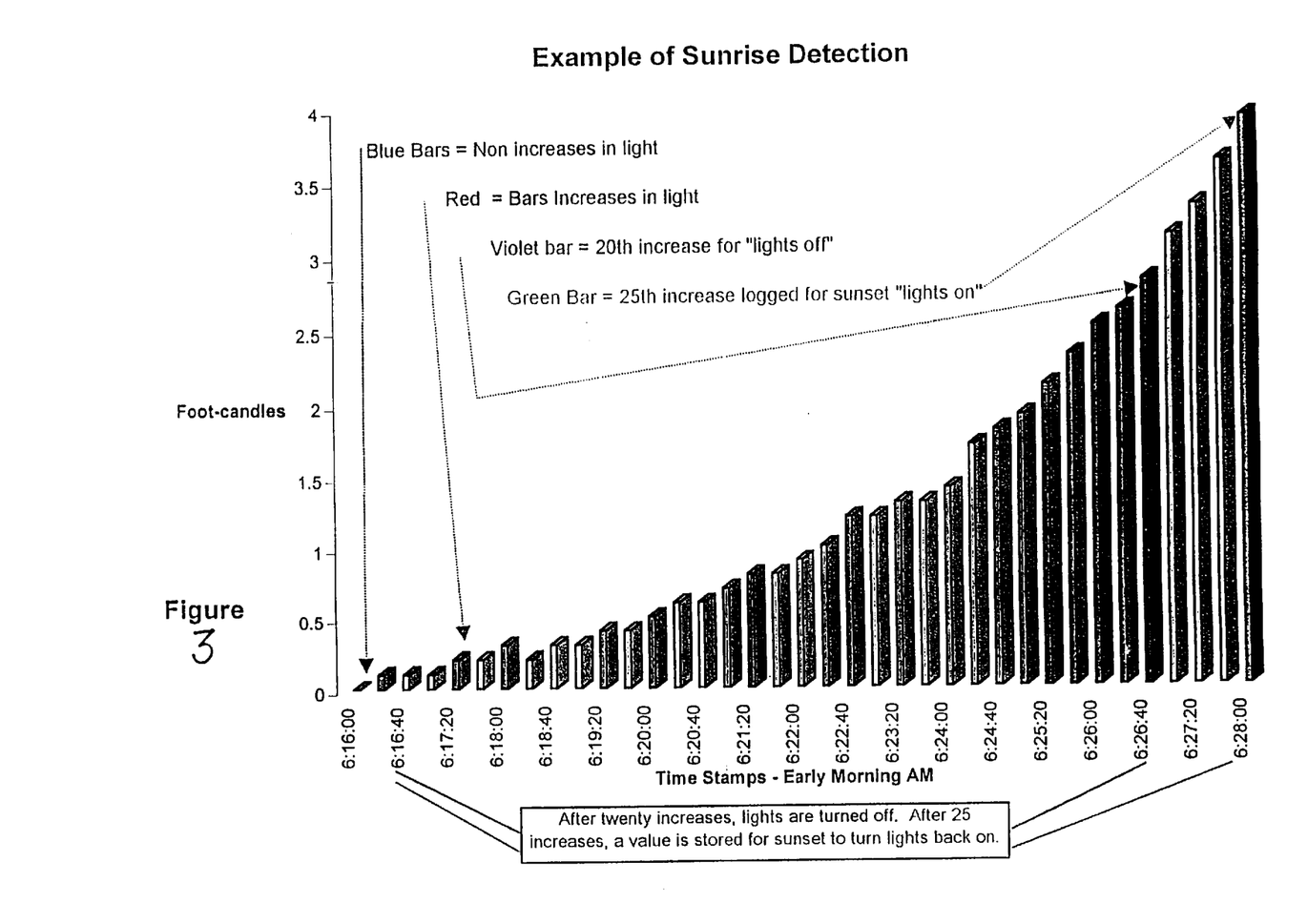
FIG. 3 is a graph showing a pattern of light increases in the morning which result in causing the microcomputer controlled photocell to produce signals for "lights on" or "lights off"

FIG. 3 is a graph plotting foot-candles vs. time as sunrise proceeds for a typical day. As previously stated, the unit 10 takes samples of light every 45 seconds for eighty minutes after dark to establish a "night" reference which is basically the only constant. The system will continue to sample the ambient light every 45 seconds to see if there is a change. As shown on the graph, no change is shown until 6:16:40 at which time there is a sensed increase in light. At 6:17:20, there is another increase. At 6:17:40 there is no increase. Another increase is seen at 6:18:00. No increase then is sensed until 6:19:20. Other increases are seen at 6:21:00 and 6:21:20 and 6:21:40. The periods of no increase keep diminishing until beginning at 6:24:00 there is steady series of increases to 6:26:40 at which point the microcomputer has registered twenty increases. The light value at approximately 2.9 foot candles is registered as a light value for "lights off." At this point the microcomputer 20 produces an output to the "alarm" terminal which is transmitted to the CPU/Command unit 17 to turn off lamps 15. The microcomputer 20 will continue to sense increasing light values until 6:28:00 at which time it stores a light value at approximately 4.1 foot candles which is the "sunset detect" value which will be used when the light diminishes at the end of the day to turn the lights back on. The light values will continue to increase and the unit 10 will continue to monitor light values over the "sunset detect" value every 45 seconds for 80 minutes at which time it enables the microcomputer to react to the light values below the "sunset detect" value.

Figure 4:
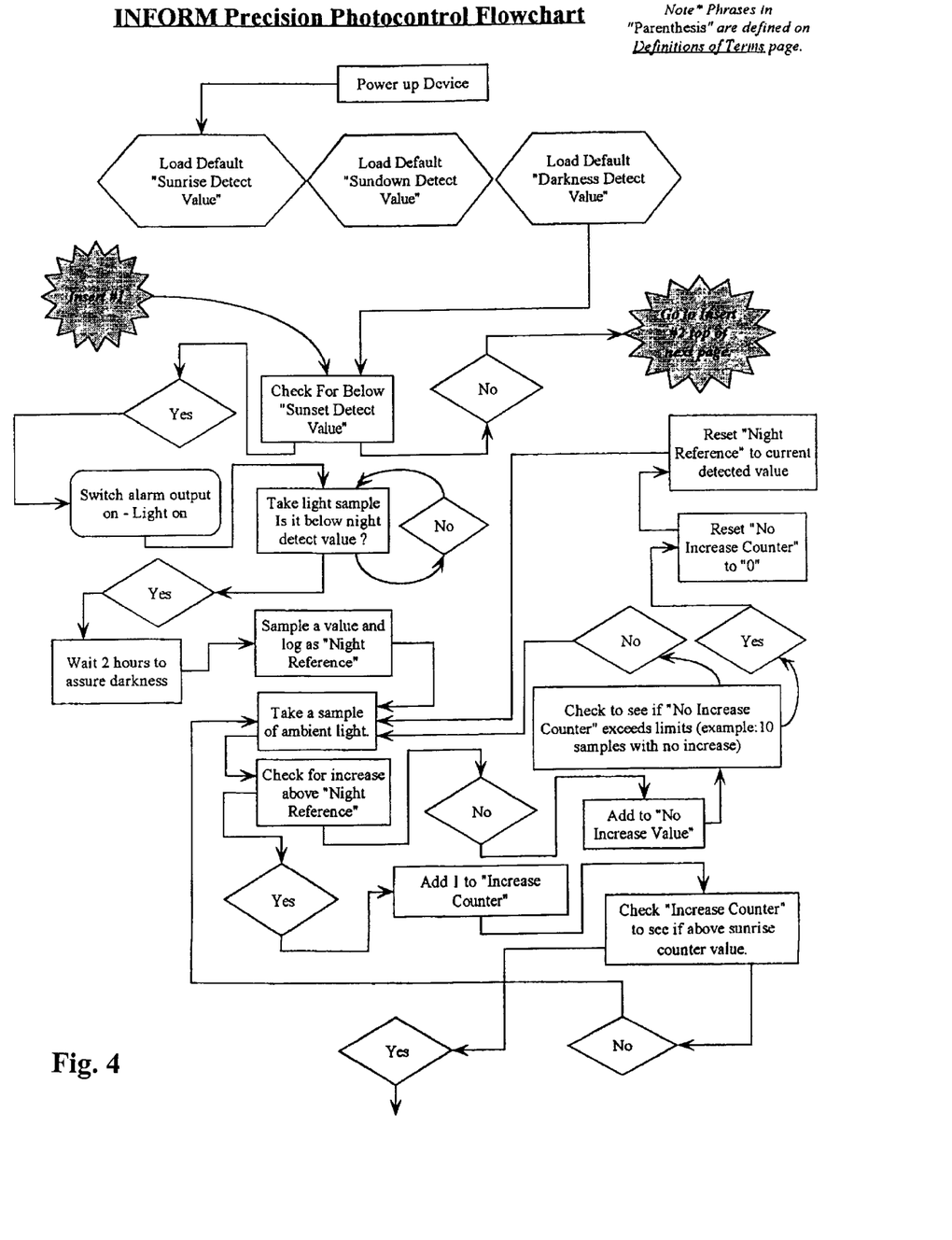
FIGS. 4 and 4A constitute a flowchart which describes the operation of the microcomputer controlled photocell of the invention.
Figure 4A:
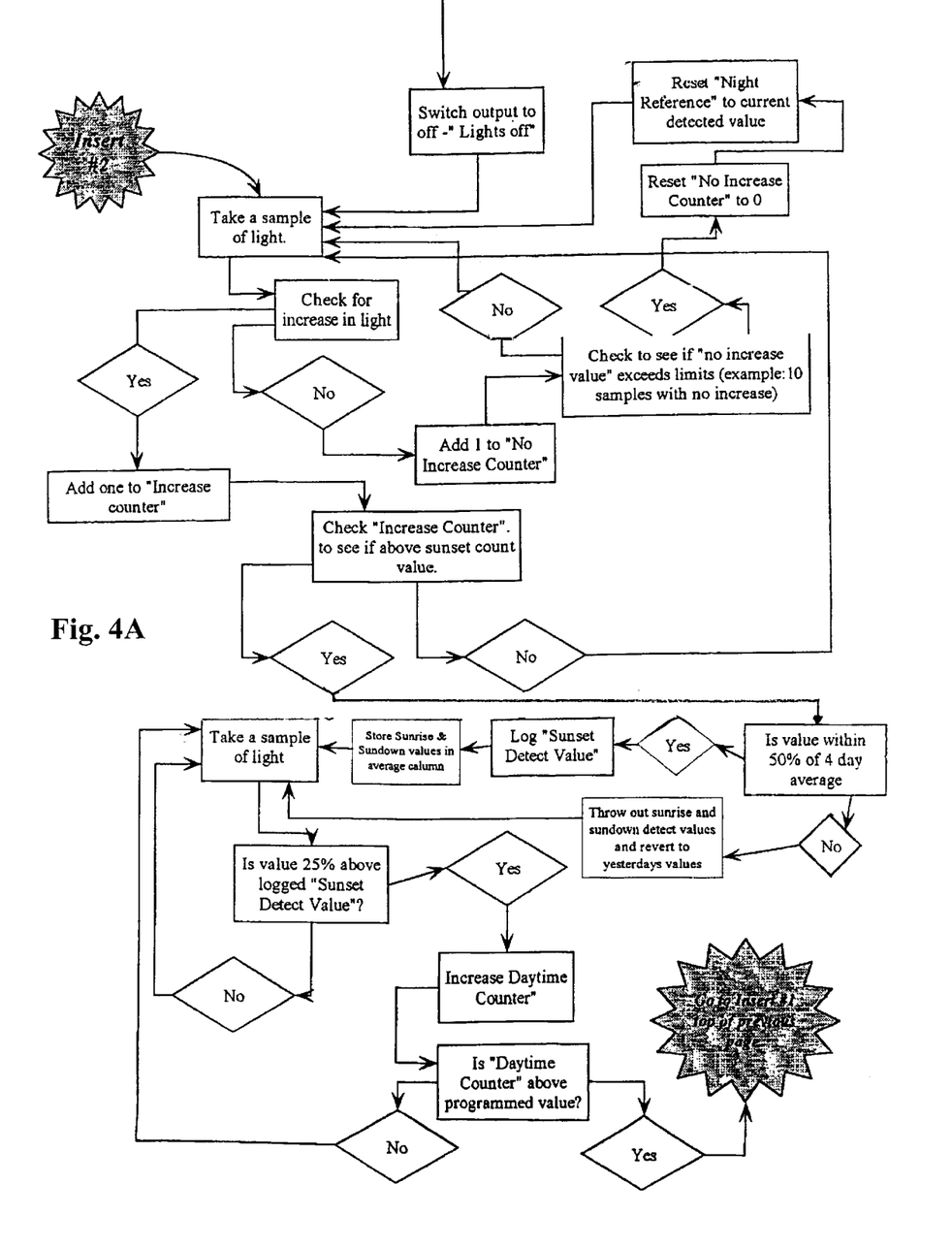

FIGS. 4 and 4A are two parts of a flowchart describing the operation of the Unit 10. Definitions of the terms used in connection with FIGS. 4 and 4A appear below.

SUNRISE DETECT VALUE—A value that when reached (after a period of darkness) will switch off the lighting connected to the microcomputer controlled photocell unit. It is stored everyday after a preset amount of light increases have been accumulated after a preset time of darkness.

SUNDOWN DETECT VALUE—This is a value that is stored everyday after a preset amount of increases have been accumulated after a preset time of darkness. This value is usually higher than the sunset detect value, but does not have to be. It is stored everyday after a preset amount of light increases have been accumulated after a preset time of darkness.

DARKNESS DETECT VALUE—This is a fixed value that is stored in the microcomputer. After sunset has been detected and lights are switched on, the microcomputer looks for light samples below this value. When a preset number of samples have been accumulated below this value, a flag is set to tell the microcomputer that it is night time and to start accumulating increases of light of sunrise detection.

NIGHT REFERENCE—This is a value that is sampled and stored during darkness. This will be used as the reference to detect increases in light at sunrise.

INCREASE COUNTER—A counter that is used to detect a condition that is stable over a period of time. For example, an increase counter is used to detect sunrise by accumulating increasing values above the night reference value for a programmed number of samples.

DAYTIME COUNTER—A counter that is used to detect that it is now daytime. This is accomplished by detecting a programmed number of light values that are above the sunset detect value.

NO INCREASE COUNTER—A counter that is used to detect "no change" condition. For example when an increase of light occurs in the middle of the night (a lightning flash for instance) an increase in light will be detected. If upon the next sample, there is no more increase, a counter will keep track of consecutive "no increase" values and then the total reaches a programmed value (such as ten times) the sunrise increase counter will be reset to 0 and start over. This eliminates short term increases in light from accumulating in the increase counter When the power is applied, three arbitrary default values are loaded into the system, a "sunrise detect" value, a "sundown detect" value and a "darkness detect" value. The microcomputer 20 will check sensed light values to determine if they are below "sunset detect" value and, if so, an alarm output will request that the lamps 15 be turned on. If not, the system will continue to sample the light until it sees samples that are below "sunset detect" value at which time it turns the lights on.

If further samples show that light is below "sunset detect" the system will wait for a period such as two hours to assure darkness and then will take a predetermined number of samples to be sure it is night. Further light samples are then taken which are compared with the present "night reference" value. If there are no such increases, counts are added to a "no increase" counter which is then checked to see if this counter exceeds its limits. If it does, the counter is reset to zero and the "night reference" is reset to the current detected value.

If there are increases above the "night reference" value each such increased reading adds to the "increase counter." The processor will then check to see if the count of increases is above the sunrise counter value (as described above.) If not, a new light sample is taken, checked for an increase above "night reference" value and the above-described inputs to the "increase counter" or the "no increase counter" occur all over again.

If the increase counter is above the sunrise counter value, the microcomputer will send an alarm signal to turn off lamps 15 and further samples are taken to arrive at "sundown detect" value which is stored until the end of the day as described above, but the system continues to take light samples.

Referring back to the initial check for "sunset detect" value, if the light values sampled are below such value further samples are taken checking for increases in light. If no increases are sensed counts are added to the "no increase" counter. When the limit of this counter is reached, the "no increase" counter is reset to zero and the "night reference" is reset to the current detected values after which the microcomputer 20 continues taking samples of light. If in checking for increases in light, such increases are found, each sample will add one to the "increase counter." This counter is checked to see if above the sunset count value, this "sunset detect" value is logged into the system and further light samples are taken. When light values reach 25% above the logged "sunset detect" value, counts are added to the daytime counter. If the daytime counter is not above its programmed value, further samples of light are taken. If the "daytime counter" is above its programmed value, then the microcomputer checks for light values below the "sunset detect" value.

Figure 5:
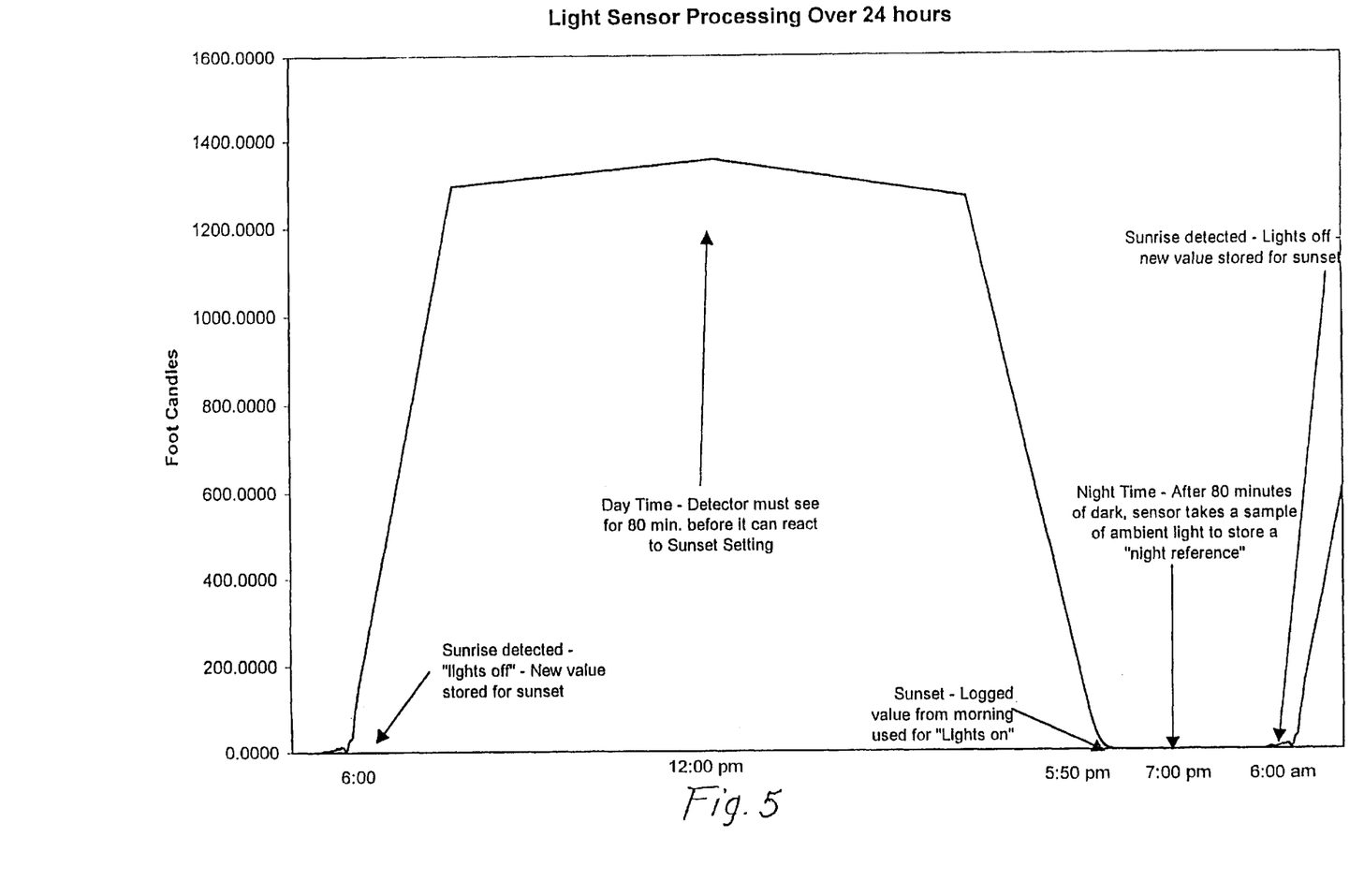
FIG. 5 is a curve plotting foot-candles vs. time through a typical day showing the time relationships of the various control signals and the response provided by the microcomputer controlled photocell of the invention.

FIG. 5 is a graph plotting foot-candles vs. elapsed time over a typical day. From a night reference which is assumed to be dark, the system sees no or very little light and no steady increase in light until just before 6:00 a.m. when the sensed increase occurs over sufficient number of light samples to send a "lights off" signal. With further increases in light a new light value is sensed and stored for the "sunset detect" signal. The foot candle readings then increase substantially and maintain a high value through most of the day. After 80 minutes of sensed light values above the "sunset detect" value, the microcomputer is armed to look for the "sunset detect" value again. As the light diminishes late in the day, the sunset detect value is reached and an output signal is transmitted to turn on the lights. After 80 minutes of dark, the sensor takes a light sample of ambient light to store as a "night reference". This reference is maintained until the sensor again detects a series of sample of increasing light values and transmits a "lights off" signal.

Figure 6:
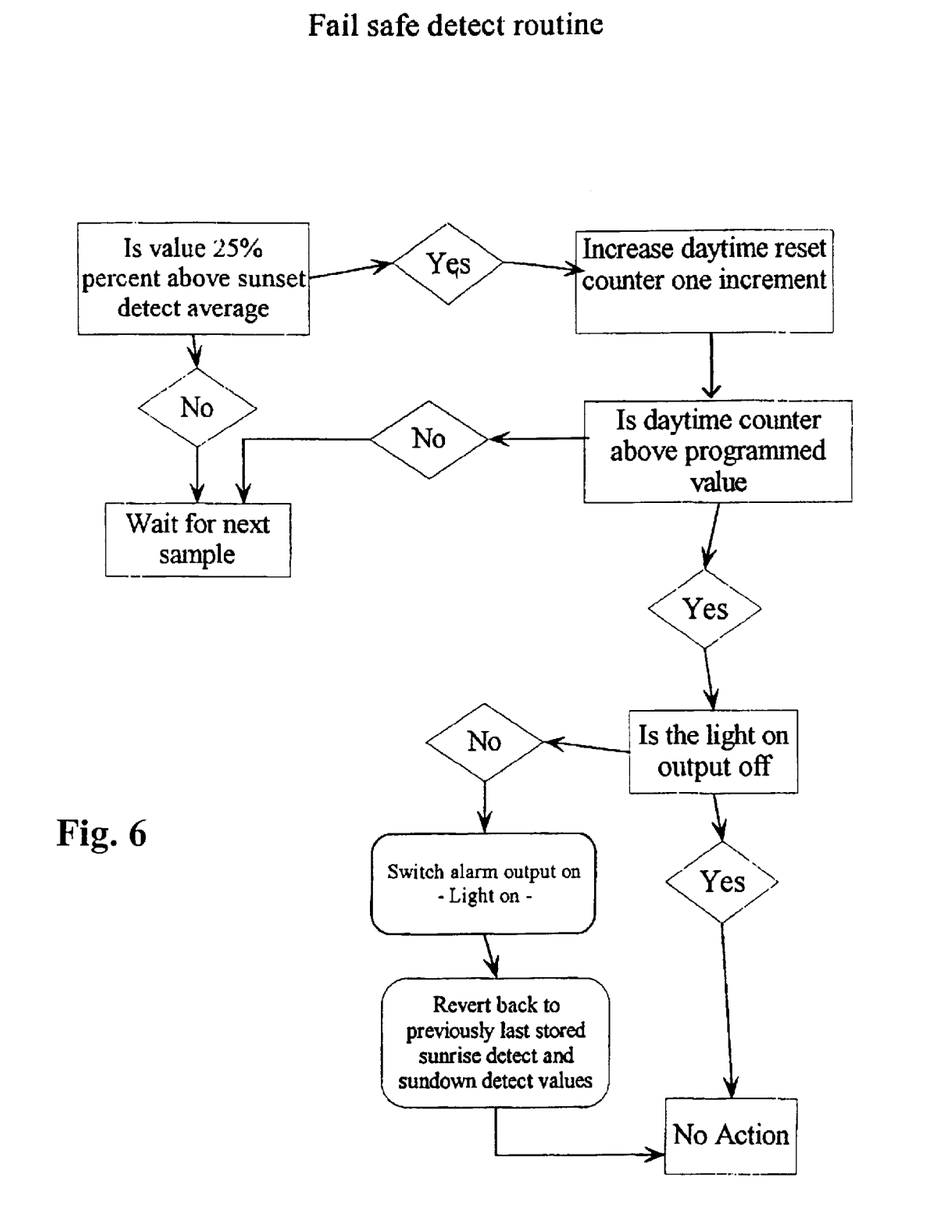
FIG. 6 is a flow diagram of the Fail Safe Detect Routine of the invention.

The microprocessor also contains software to correct itself in case of installer error or unseen environmental changes. This is Fail Safe Detect Routine of FIG. 6. This routine check is to see if it is day time but the microprocessor still thinks the sun has not risen, or the routine has gotten confused and the software has no further point of reference to decide whether it should wait for sundown or wait for sun up.

The above-described embodiments of the present invention are merely descriptive of its principles and are not to be considered limiting.

We claim:

1. A microcomputer controlled photocell system for use in controlling the operation of a load device comprising:

a photocell producing electrical signals varying with the intensity of ambient light sensed thereby;

a microcomputer connected to receive and sample electrical signals from said photocell at predetermined intervals including a clock, counter means for counting said sampled signals and switching means responsive to predetermined counts of said counter for switching said load device on and off;

wherein said microcomputer samples ambient light values sensed by said photocell a plurality of times per minute and establishes a night reference light value after sensing minimum light values for over a predetermined cycle time; and after a night reference light value is established, the microcomputer continues to sample light values and responds to a substantial number of continuously increasing light values to switch said load device off and after a predetermined additional number of continuously increasing light values establishes and stores a sunset detect light value whereby diminishing light values near sunset are monitored and when said sunset detect light value is reached, said computer acts to switch said load device on.

2. A microcomputer controlled photocell unit comprising:

a microcomputer including a clock, counter means and means for effectively producing output signals;

a photocell connected to said microcomputer;

said counter means receiving and counting light sample signals from said photocell and responsive to receiving a substantial number of samples of very low value for setting a night reference value and responsive to receiving from said photocell a predetermined number of light samples of increasing light values for establishing and storing a lights off signal and for responding to a predetermined number of additional samples of increasing light values to establish and store a sunset detect value, said counter means causing said microcomputer to produce output signals in response to said lights off signal and said sunset detect signal; and means in said microcomputer responsive to receiving a predetermined number of light samples above said sunset detect value for arming said microcomputer to respond to detected light samples at said sunset detect value and to produce a lights on output signal.

3. A microcomputer controlled photocell unit as claimed in claim 2 further comprising an oscillator circuit having a long time period connected to said microcomputer whereby said microcomputer is caused to receive and count light samples only over a short part of each period of said oscillator.

4. A microcomputer controlled photocell unit as claimed in claim 2 wherein said microcomputer includes a no increase counter which counts light samples indicating increases in light values within a predetermined number of samples and if said light samples do not continue to show an increase up to a predetermined value within said predetermined number of samples said no increase counter will reset to zero and start again.

5. A microcomputer controlled photocell unit comprising:

a microcomputer including a clock, counters and means for effectively producing output signals;

a photocell connected to said microcomputer;

means in said microcomputer for periodically sampling light signals from said photocell;

means in said microcomputer responsive to a substantial number of light samples of very low value for establishing a night reference value;

means in said microcomputer responsive to reception of a predetermined number of light samples of increasing light values for establishing a lights off signal and also responsive to a predetermined number of further increases in light value for establishing a sunset detect value signal; and means responsive to said lights off signal and said sunset detect value signal for providing output signals from said unit.

6. A microcomputer controlled photocell unit as claimed in claim 5 wherein an oscillator circuit having a much longer period than the period of one cycle of said clock is connected to said microcomputer whereby said microcomputer is caused to receive and count said light sample over a limited number of cycles of said clock constituting a very short part of the period of said oscillator.

* * * * *